United States Patent [19]

Abbott et al.

[11] Patent Number: 5,068,861
[45] Date of Patent: Nov. 26, 1991

[54] ETALON APPARATUS

[75] Inventors: Rexford J. Abbott, San Jose; David L. Wright, Redwood City, both of Calif.

[73] Assignee: Spectra-Physics Lasers, Inc., Mountain View, Calif.

[21] Appl. No.: 555,717

[22] Filed: Jul. 19, 1990

[51] Int. Cl.$^5$ .............................................. H01S 3/10
[52] U.S. Cl. ...................................... 372/20; 372/32; 372/98
[58] Field of Search ..................... 372/20, 32, 108, 98, 372/105, 101

[56] References Cited

U.S. PATENT DOCUMENTS

| | | | |
|---|---|---|---|
| 3,866,139 | 2/1975 | Currie | 372/20 |
| 4,097,818 | 6/1978 | Manoukian et al. | 372/20 |
| 4,569,053 | 2/1986 | Roullard, III et al. | 372/20 |
| 4,977,563 | 12/1990 | Nakatani et al. | 372/20 |

OTHER PUBLICATIONS

Jenkins and White, Fundamentals of Optics, 4th Ed., McGraw-Hill (1976), pp. 301–307.
Hercher, "Tunable Single Mode Operations of Gas Lasers Using Intracavity Tilted Etalons", *Applied Optics,* Jun. 1969, vol. 8, No. 6 at pp. 1103–1106.

*Primary Examiner*—James W. Davie
*Attorney, Agent, or Firm*—Fliesler, Dubb, Meyer & Lovejoy

[57] ABSTRACT

An apparatus for applying a load to an etalon so as to enable the accurate tuning of desired frequencies or ranges of frequencies. The invention includes first and second optical surfaces separated and disposed highly parallel with respect to each other by an electric longitudinal spacer member. A biasing means applies a longitudinal load to the elastic longitudinal spacer member. The applied load is uniformly distributed throughout the spacer member by a longitudinal load distribution means, which is disposed between said biasing means and at least one of said optical surfaces. The distance, d, between the first and second optical surface is directly proportional to the load applied by the biasing means. The load may be varied, in one embodiment of the invention, using a bias adjustment means acting in mechanical cooperation with the biasing means.

16 Claims, 2 Drawing Sheets

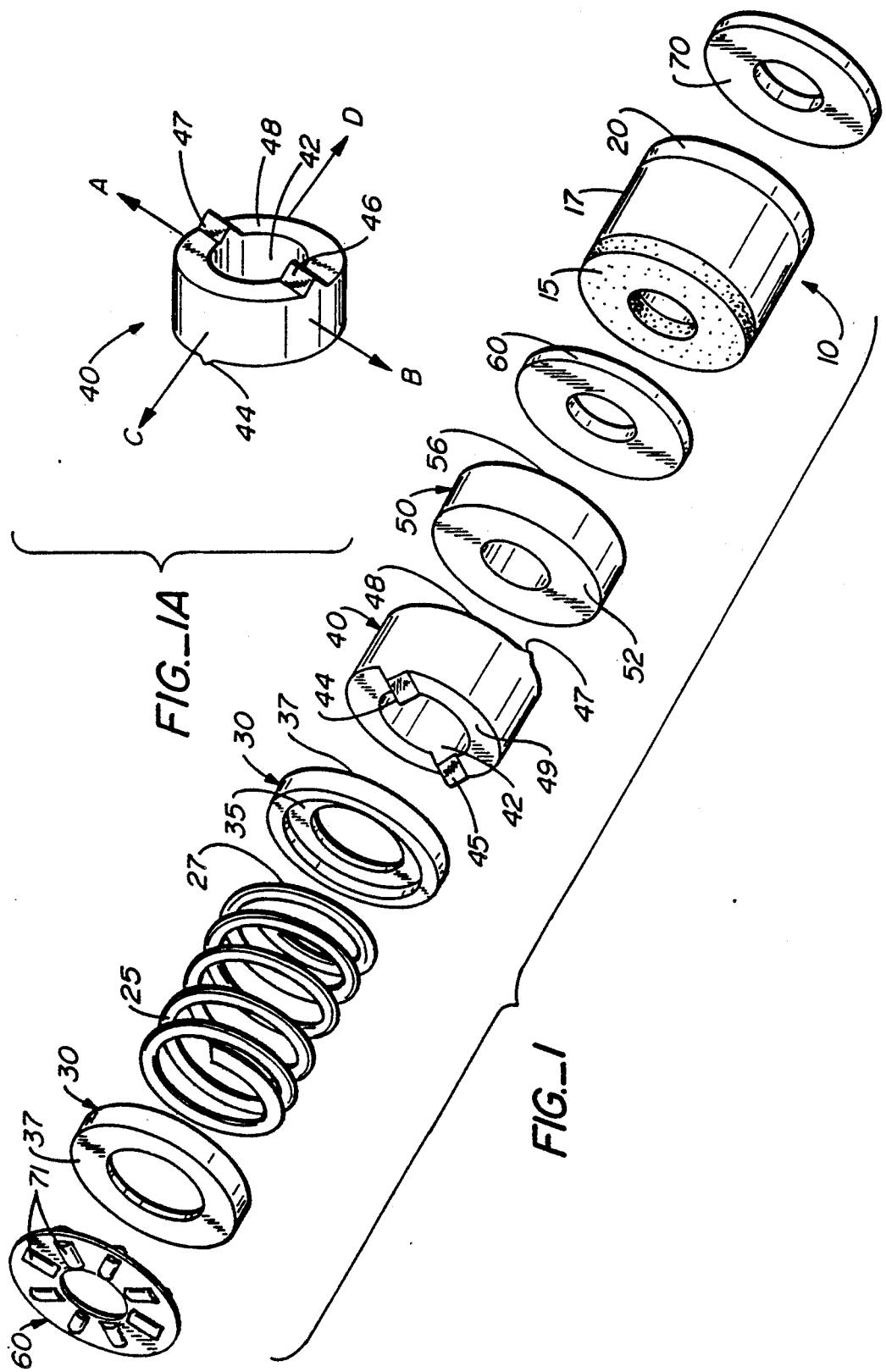
FIG._1A
FIG._1

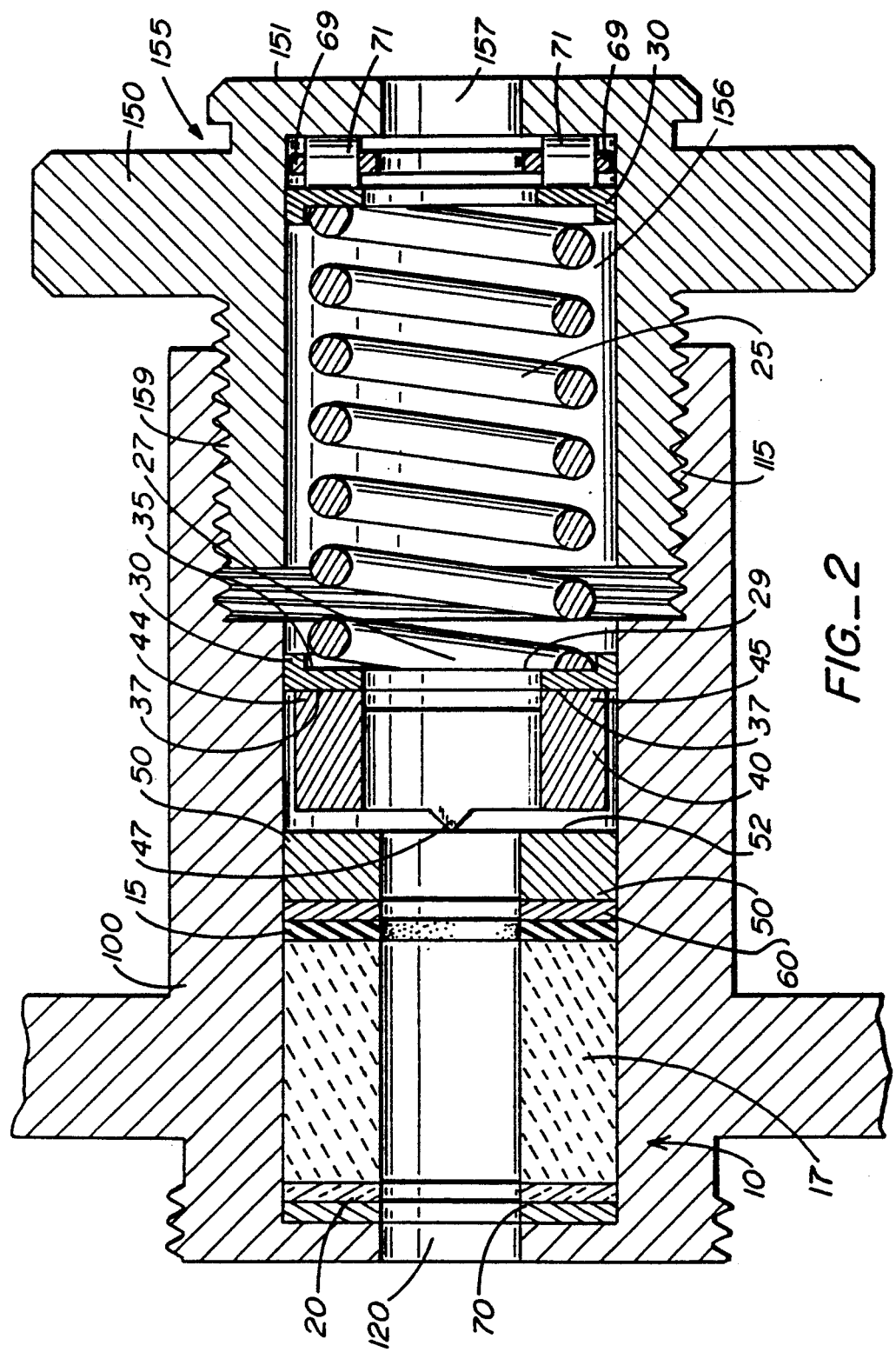

ETALON APPARATUS

BACKGROUND OF THE INVENTION

The present invention generally relates to the field of laser optics and, more specifically, to an apparatus for varying the length of an etalon so as to select a desired transmission frequency.

An etalon is a resonant optical cavity defined by two highly parallel substantially reflective surfaces. Etalons are commonly used to obtain narrowed spectral outputs from a gas laser. In such applications, etalons are placed within the optical cavity of the gas laser and manipulated, as described below, to select a desired frequency or frequency range output for the laser. The selection of the desired spectral output of a laser is referred to in the art as "tuning." The use of etalons and the technique of "tuning" a gas laser using an etalon are well known in the art.

Typically, an etalon placed in the resonant optical cavity of a gas laser is positioned such that the reflective parallel surfaces of the etalon are misaligned (i.e., tilted) with respect to the laser's cavity mirrors. This misalignment optically decouple the etalon from the resonant cavity and, consequently, enables the etalon to act as a bandpass transmission filter. The advantage of using a tilted etalon is that the characteristics of the bandpass filter are largely unaffected by small motions of the etalon with respect to resonant optical cavity of the laser. The technique of using a tilted etalon to tune a gas laser is described in detail in Hercher, "Tunable Single Mode Operations of Gas Lasers Using Intracavity Tilted Etalons," *Applied Optics*, June 1969, Vol. 8, No. 6 at pages 1103 through 1106, which is incorporated herein by reference.

In operation, an etalon of length d and refractive index n, when tilted an angle, R, with respect to the incident light beam will shift the resonant wavelength, g, of the incident beam in the following manner:

$$vg = -gR^2/2n^2$$

expressed in terms of frequency, f, the shift may be expressed:

$$vf = fR^2/2n^2$$

Hence, the tuning curve of a tilted etalon (i.e., resonant wavelength or frequency versus angle of tilt) depends only on the refractive index of the etalon and is independent of the length of the etalon.

The frequency selectivity depends both on the etalon length, d, and the reflectivities of its surfaces. The transmission, T, of the etalon may be approximated by:

$$[1+(2F/p)^2\sin^2((2pnd\cos(R/n))/g)]^{-1},$$

where F is the finesse of the etalon, and where the absorption and scattering losses are negligible compared with the transmission at each surface. This also assumes the two reflecting surfaces are highly parallel so that after multiple reflections the light beam retraces essentially the same path. In the best case, an etalon placed inside the resonant optical cavity of a laser can select one of the discrete axial mode frequencies of the laser cavity. Because the presence of the tilted etalon has an effect upon the optical length, L, of the resonant optical cavity, the resonant frequency, $f_c$, of the resonant optical cavity is likewise shifted.

As discussed in greater detail in the Hercher article cited above, one very typical use of a tilted etalon in the gas laser environment is in the single frequency operation of an argon ion laser. If, through the use of an intracavity dispersing prism, a cw argon laser is operated on a single transition, the spectral output will generally be a rapidly fluctuating function of time. An intracavity tilted etalon can be used in order to obtain a stable single frequency output from such a laser. In such an application, for example, the free spectral range of the etalon (i.e., c/2nd) should equal or exceed the gain bandwidth of the laser.

As can be plainly seen from the preceding discussion, the ability to select particular frequencies using a tilted etalon depends largely on the ability to manipulate controlling parameters. The simplest and most common parameter manipulated is the etalon length d. Indeed, by manipulating the etalon length d by one-half wavelength of the radiation, the desired transmission frequencies or frequency ranges may be tuned.

Two types of systems for manipulating etalon length are most common in prior art systems.

The first type of system varies the etalon optical length using temperature tuning. The entire etalon is normally fabricated of a single piece of fused quartz. This material has a coefficient of optical index of refraction change with temperature that is many times its length change coefficient. It is heated or cooled through a small temperature range to tune the etalon.

This system is disadvantageous because a significant amount of time is expended in heating or cooling the body of the etalon in order to change frequencies. Another disadvantage of this type of system is the excessive cost involved in manufacturing etalons and heating equipment of sufficiently acceptable tolerances for use in the optical laser environment.

A third problem with this "solid" etalon occurs at high power levels, where small light absorption in the coatings and the fused quartz causes very significant heating effects within the glass which detunes the etalon.

The second type of system uses mechanical compression to vary the length of the etalon. In such compression-based systems, the etalon is hollow and is placed under a load such that the length of the etalon varies as a function of the load applied to the etalon. The load in such systems is typically provided by a helical compression spring which acts in mechanical cooperation with an adjustment knob or screw. The knob or screw is tightened or loosened depending upon the amount of the load to be applied to the etalon. The spring applies the load directly upon the etalon.

Use of a helical compression spring is advantageous from a cost perspective as springs, and the associated hardware used to compress the etalon, are inexpensive and relatively easy to manufacture. Moreover, tuning of the laser is virtually instantaneous. The heating and cooling periods required by thermal expansion systems is eliminated so as to enable rapid tuning. An additional advantage of the mechanically tuned etalon is that the body can be made of very low expansion materials, so that no temperature control is necessary.

The disadvantage of these prior art compression-based systems resides in the physical nature of the helical compression spring used to apply the load. Although the annular face of the spring which contacts the etalon may be milled relatively flat, the distribution of the load, regardless of the precision of the involved milling, will not be continuous about the circumference of the annular face due to the inherent physical characteristics of the spring. The load can vary, in some cases, approximately twenty-five percent about the circumference of the annular face of the compression spring.

Because the load varies about the circumference of the annular face of the spring, the load will not be applied uniformly about the circumference of the etalon. As a consequence of this uneven distribution of the load acting on the etalon, the etalon will have one of its parallel surfaces misaligned with respect to the other. As a result of misalignment, the transmission efficiency of the etalon and its ability to precisely tune desired frequencies (i.e., "bandwidth") are materially impaired.

To date, there has been no way to uniformly distribute the load applied to an etalon so as to enable highly reliable and accurate compression tuning.

SUMMARY OF THE INVENTION

The present invention relates to an apparatus for applying a load to an etalon so as to enable the accurate tuning of desired frequencies or ranges of frequencies.

The invention includes first and second optical surfaces separated and disposed highly parallel with respect to each other by an elastic longitudinal spacer member and a biasing means for applying a longitudinal load to the elastic longitudinal spacer member. The applied load is uniformly distributed throughout the spacer member by a longitudinal load distribution means, which is disposed between said biasing means and at least one of said optical surfaces. The distance, d, between the first and second optical surface is directly proportional to the load applied by the biasing means.

The load may be varied, in one embodiment of the invention, using a bias adjustment means acting in mechanical cooperation with the biasing means. In another embodiment, the load distribution means consists of two orthogonally disposed fulcrums each in contact with planar surfaces.

The present invention provides a means for applying a uniform load about the circumference of the etalon and, thus, minimizes problems of precise alignment arising from unevenly distributed load. Hence, when a load is applied to the etalon in order to vary the etalon length d, the potential for optical surface misalignment, due to the uneven application of load, is greatly minimized.

Consequently, it is an object of the present invention to provide a means for varying the length of an etalon by applying a circumferentially uniform compressive load while minimizing optical surface misalignment due to the uneven application of such compressive load.

BRIEF DESCRIPTION OF THE DRAWINGS

FIG. 1 is a perspective view of one embodiment of the present invention.

FIG. 1A is a perspective view of the pivot element of the present invention.

FIG. 2 is a view in cross-section of one embodiment of the present invention.

DETAILED DESCRIPTION OF THE DRAWINGS

FIG. 1 is a perspective view of the preferred embodiment of the invention.

Etalon 10 includes compressible body portion 17 and optical windows 15 and 20. The inner optical surfaces of 15 and 20 are coated with a partially reflective material in the conventional manner. The outer surfaces of 15 and 20 are anti-reflection coated, and tilted slightly with respect to the inner surfaces in order to avoid extraneous reflection effects. The length of compressible body portion 17 may be mechanically tuned by applying a load axially thereto.

Helical compression spring 25 has an annular flattened face, not shown in FIG. 1, at both ends. The annular flattened face of helical compression spring 25 has been ground so that it is substantially planar.

Washer 30 is a conventional washer having a planar face 37 and, on the opposite face, a machined counterbore 35. The ends 27 of helical compression spring 25 are received in machined channel 35 of washer 30. At the extreme end of spring 25, the planar surface 37 of washer 30 is in contact with roller bearing 69. Roller bearing 69 is a conventional roller bearing including a plurality of roller elements 71 disposed radially about the circumference of the roller bearing 69.

Referring to FIG. 1A, pivot element 40 has a bore 42 therethrough. The pivot element 40 includes two parallel faces 48 and 49 orthogonally disposed with respect to the axis of the bore 42. Fulcrums 44 and 45 are disposed along the diameter of face 49 at either side of bore 42. Likewise fulcrums 46 and 47, shown in FIG. 1A, are disposed along the diameter of face 48 at either side of bore 42. Axis AB, defined by fulcrums 46 and 47, is perpendicular to axis CD, defined by fulcrums 44 and 45. Referring again to FIG. 1, washer 50 includes planar faces 52 and 56, which are parallel with each other.

Washer 60 and washer 70 are of substantially the same diameter as washer 50. Although washers 60 and 70 are, in the preferred embodiment of the invention, composed of rubber and aluminum respectively, it should be understood that a washer composed of a similar pliable material could be used. Additionally, it should be noted that washers 60 and 70 may also be composed of a hard material, provided that their surfaces are flat and polished.

FIG. 2 is a view in cross-section of the invention assembled for use and depicting the individual components of the invention, shown in FIG. 1, assembled together in etalon housing 100. Etalon housing 100 has an inside diameter roughly equal to the outside diameter of etalon 10 and includes a beam aperture 120. Washer 70, which is of a diameter roughly equal to the diameter of etalon 10, is seated in etalon housing 100 proximate to beam aperture 120. Etalon 10 is likewise seated in the etalon housing such that optical surface 20 is flush against washer 70. Washer 60, also of a diameter roughly equal to the diameter of the etalon, is seated flush against optical surface 15. Washer 50 is seated flush against rubber washer 60.

Pivot element 40 is seated in the housing such that fulcrums 46 and 47 establish essentially linear contact with the face 52 of washer 50. Washer 30 is seated against pivot element 40 in etalon housing 100 such that the planar face 37 of washer 30 establishes essentially linear contact with fulcrums 44 and 45. Because pivot element 40 is of a substantially smaller outer diameter than the interior diameter of etalon housing 100, it is free to partially rotate or rock about axes AB and CD, shown in FIG. 1A. As noted, the axes AB and CD are orthogonal to each other. Referring again to FIG. 2, because washer 30 is of a diameter substantially smaller than that of etalon housing 100, it is likewise free to partially rotate or rock in cooperation with pivot element 40 about axes coincident with axes AB and CD, shown in FIG. 1A.

The flattened face 29 at the end 27 of helical compression spring 25 is received in the counterbore 35 of washer 30. The remaining length of helical compression spring 20 is seated in the recess 156 of load adjustment knob 150. The extreme end of spring is received in the counterbore 35 of washer 30. The planar face 37 of washer 30 is in contact with roller bearing 69 such that the individual roller elements 71 establish contact with the planar surface 37 of washer 30. Load adjustment knob 150 is threaded at end 159 and may be screwed into the corresponding threaded end 115 of etalon housing 100. The end 151 of load adjustment knob 150 has a beam aperture 157 bored therethrough.

When assembled in etalon housing 100, the entire assembly permits an incident beam, not shown in FIG. 2, to pass through either apertures 120 or 157 and optically traverse etalon 10. Because of the design of each of the individual components, the optical path of the incident beam is unobscured along the radial axis of etalon body 100.

To apply a load to etalon 10, the load adjustment knob 150 is rotated in a direction such that the knob assembly 155 is rotated along the threads towards the etalon 10. As the knob assembly 155 moves toward the etalon 10, the spring 25 is compressed between the end 151 of the adjustment knob and washer 30. Roller bearing 69 substantially eliminates tortional forces extended on the spring 25 due to the rotation of adjustment knob 150. Consequently, a load is applied by helical compression spring 25 to washer 30. Because the load is unevenly distributed about the circumference of the flattened portion 29 of the end 27 of helical compression spring 25, the load applied to washer 30 will likewise be unevenly distributed about the circumference of washer 30 in a first transverse distribution.

Because of the ability of both pivot element 40 and washer 30 to rock about the orthogonal axes defined by fulcrum pairs 46 and 47, the pivot element 40 and washer 30, upon application of the load, will rotate about the orthogonal axes AB and CD, shown in FIG. 1A, to a state of mechanical equilibrium. Referring again to FIG. 2, the load is applied to washer 50 by the linear contact between fulcrums 46, not shown in FIG. 2, and 47 and the planar surface 52 of washer 50. The individual loads applied to the planar face 52 of washer 50 by fulcrums 46 and 47 are essentially equal due to the condition of mechanical equilibrium established by washer 30 and bearing 40. Consequently, the applied load will be distributed, in a second transverse distribution essentially equally about the circumference of washer 50, which itself will apply an essentially circumferentially uniform load to the etalon 10.

The load applied to etalon 10 may be increased or decreased by rotation of adjustment knob 150. Additionally, the knob assembly 155 may be removed altogether and helical compression springs having different compressive loads substituted in the knob assembly 155.

Accordingly, compressive loads may be accurately applied by rotation of knob 150 to vary the length of the etalon, d, so as to enable selection of transmission frequency or a range of frequencies. The etalon length d will, of course, be proportional to the load applied to etalon 10 by helical compression spring 25. Thus, the etalon length d may be set with relative precision using the knob 150.

The present invention minimizes misalignment of optical surfaces in the etalon due to a relatively uniform compressive load applied to optical surface 15 and distributed axially along the body of etalon 10.

It is to be understood that the above disclosure discloses merely one embodiment of the present invention. Modifications to the invention as disclosed may be made, which nonetheless fall within the scope and spirit of the invention and the appended claims. Other aspects, objects and advantages of this invention can be obtained from a study of the drawing, the disclosure and the appended claims.

What is claimed is:

1. An improved etalon apparatus comprising:
    first and second optical windows having surfaces disposed highly parallel with respect to each other;
    elastic longitudinal spacer member for maintaining a distance between said first and second optical surfaces;
    biasing means for applying a longitudinal load having a first transverse distribution; and
    longitudinal load distribution means for receiving and redistributing the first transverse distribution of the longitudinal load applied by said biasing means and applying the longitudinal load to said elastic longitudinal spacer member in a second transverse distribution.

2. The apparatus of claim 1 wherein said elastic spacer member contacts said optical surfaces in a circular region and said second transverse distribution is essentially uniform throughout said circular region.

3. The apparatus of claim 2 wherein said first and second optical surfaces are spaced apart a distance, d, and wherein the change in distance d is directly proportional to the load applied to said spacer member.

4. The apparatus of claim 3 wherein said biasing means includes a spring and said load distribution means further includes:
    an annular washer having first and second surfaces, said first surface having a circumferential recess for mechanically engaging one end of said spring, said second surface being planar;
    a pivot element having first and second surfaces and including first and second fulcrums respectively disposed diametrically upon said first and second pivot element surfaces, said first fulcrum defining a diametrical axis orthogonally disposed with respect to a diametrical axis defined by said second fulcrum; and
    a contact washer having first and second planar surfaces, said first planar surface engaging one of said optical windows in said circular region;
    said pivot element disposed between said annular washer and said contact washer, said first fulcrum engaging said planar surface of said annular washer, said second fulcrum engaging said second planar surface of said contact washer.

5. The apparatus of claim 1 wherein said biasing means includes a spring and said load application means further includes:
    an annular washer having first and second surfaces, said first surface having a recess for mechanically engaging one end of said spring, said second surface being planar;
    a pivot element having first and second surfaces and including first and second fulcrums respectively disposed upon said first and second pivot element surfaces, said first fulcrum defining an axis orthogonally disposed with respect to an axis defined by said second fulcrum; and, a contact washer having first and second planar surfaces, said first planar surface engaging one of said optical windows;

said pivot element disposed between said annular washer and said contact washer, said first fulcrum engaging said planar surface of said annular washer, said second fulcrum engaging said second planar surface of said contact washer.

6. An adjustable etalon comprising:

an elastic longitudinal spacer member being of a compressively variable length d and having first and second ends;

first and second optical windows having surfaces disposed highly parallel to each other respectively at first and second ends of said spacer member;

biasing means for applying a longitudinal load having a first transverse distribution;

load distribution means for receiving and redistributing the first transverse distribution of the load applied by said biasing means, said load distribution means applying the longitudinal load in a second transverse distribution essentially uniformly throughout said spacer member; and, bias adjustment means in mechanical cooperation with said biasing means for varying the longitudinal load applied to said load distribution means;

said longitudinal load being applied to compress said spacer member so as to very the length d of said spacer member.

7. The apparatus of claim 6 wherein said biasing means includes a spring and said load distribution means further includes:

a first washer having first and second surfaces, said first surface having a recess for mechanically engaging one end of said spring, said second surface being planar;

a pivot element having first and second surfaces and including first and second fulcrums respectively disposed upon said first and second pivot element surfaces, said first fulcrum defining an axis orthogonally disposed with respect to an axis defined by said second fulcrum; and, a contact washer having first and second planar surfaces, said first planar surface engaging one of said optical windows;

said pivot element disposed between said first washer and said contact washer, said first fulcrum engaging said second surface of said first washer, said second fulcrum engaging said second planar surface of said contact washer.

8. The apparatus of claim 7 wherein the spring comprises a helical compression spring.

9. The apparatus of claim 6 wherein the distance d is directly proportional to the longitudinal load applied to said spacer member.

10. An apparatus for applying a load to an etalon, the etalon having first and second optical surfaces disposed parallel with respect to each other at each end of a spacer member, the apparatus comprising:

a spring for applying a load, said spring having an annular face and applying the load in a first transverse distribution nonuniformly about said annular face;

load distribution means for receiving and redistributing the load applied by said spring, said load distribution means engaging said annular face of said spring and the etalon, said load distribution means redistributing the load applied by said spring in a second transverse distribution uniformly throughout the spacer member so as to compress the spacer member; and bias adjustment means disposed in mechanical cooperation with said biasing means for varying the load applied to said load distribution means.

11. The apparatus of claim 10 wherein said first and second optical surfaces are spaced apart a distance, d, essentially equal to the length of the spacer member and wherein said distance d is directly proportional to the load applied by said spring, said bias adjustment means being used to vary said distance d.

12. The apparatus of claim 11 wherein said load distribution means further includes:

an annular washer having first and second surfaces, said first surface having a circumferential recess for mechanically engaging one end of said spring, said second surface being planar;

a pivot element having first and second surfaces and including first and second fulcrums respectively disposed diametrically upon said first and second pivot element surfaces, said first fulcrum defining a diametrical axis orthogonally disposed with respect to a diametrical axis defined by said second fulcrum; and, a contact washer having first and second planar surfaces, said first planar surface engaging said etalon;

said pivot element disposed between said annular washer and said contact washer, said first fulcrum engaging said second surface of said annular washer, said second fulcrum engaging said second planar surface of said contact washer.

13. An apparatus for applying a load to an etalon, including first and second optical surfaces and a spacer between the optical surfaces, for controlling a distance between the first and second optical surfaces, the apparatus comprising:

first means for supplying a variable longitudinal load having a first transverse distribution;

second means, engaging the etalon, for applying a longitudinal load to the spacer in a second transverse distribution, so that the distance between the first and second optical surfaces varies with the longitudinal load applied to the spacer; and third means, between the first means and the second means, and receiving the variable longitudinal load, for redistributing the variable longitudinal load essentially independently of the first transverse distribution and to the second transverse distribution and supplying the redistributed variable longitudinal load to the second means.

14. The apparatus of claim 13, wherein the spacer comprises an annular member having an axis essentially perpendicular to the first optical surface, and engaging the first optical surface in a circular region, and the second transverse distribution provides essentially uniform longitudinal load about the axis of the annular member over the circular region.

15. The apparatus of claim 13, wherein the second means comprises a helical compression spring supplying the variable longitudinal load in the first transverse distribution.

16. The apparatus of claim 15, wherein the third means comprises:
- an annular washer having first and second surfaces, the first surface formed to receive one end of the helical compression spring, the second surface including a flat region;
- a pivot member having first and second sides, the first and second sides including first and second fulcrums respectively disposed diametrically along orthogonal axes; and
- a contact washer having a first surface mating with the etalon and a second surface including a flat region;
- wherein the pivot member is disposed between the annular washer and the contact washer, and the first fulcrum engages the flat region on the second surface of the annular washer, and the second fulcrum engages the flat region on the second surface of the contact washer.

* * * * *